United States Patent Office 3,442,116
Patented May 6, 1969

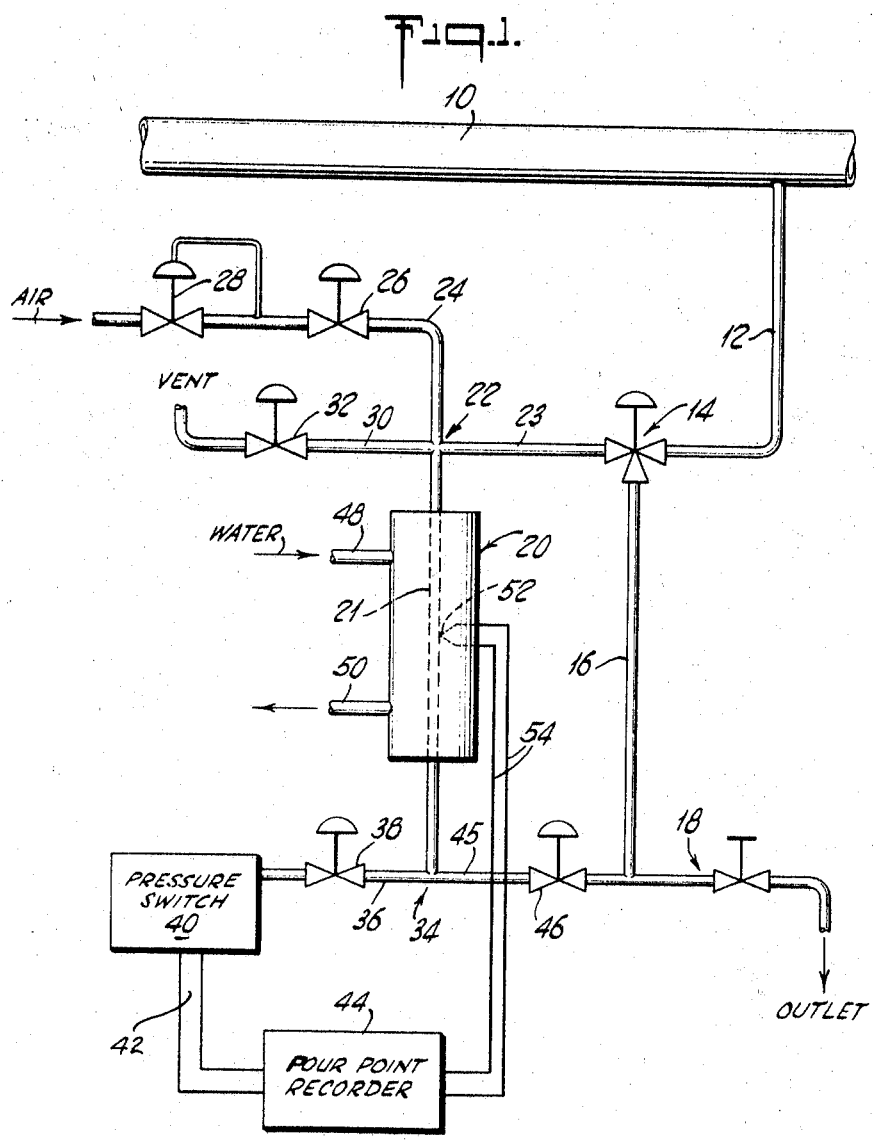

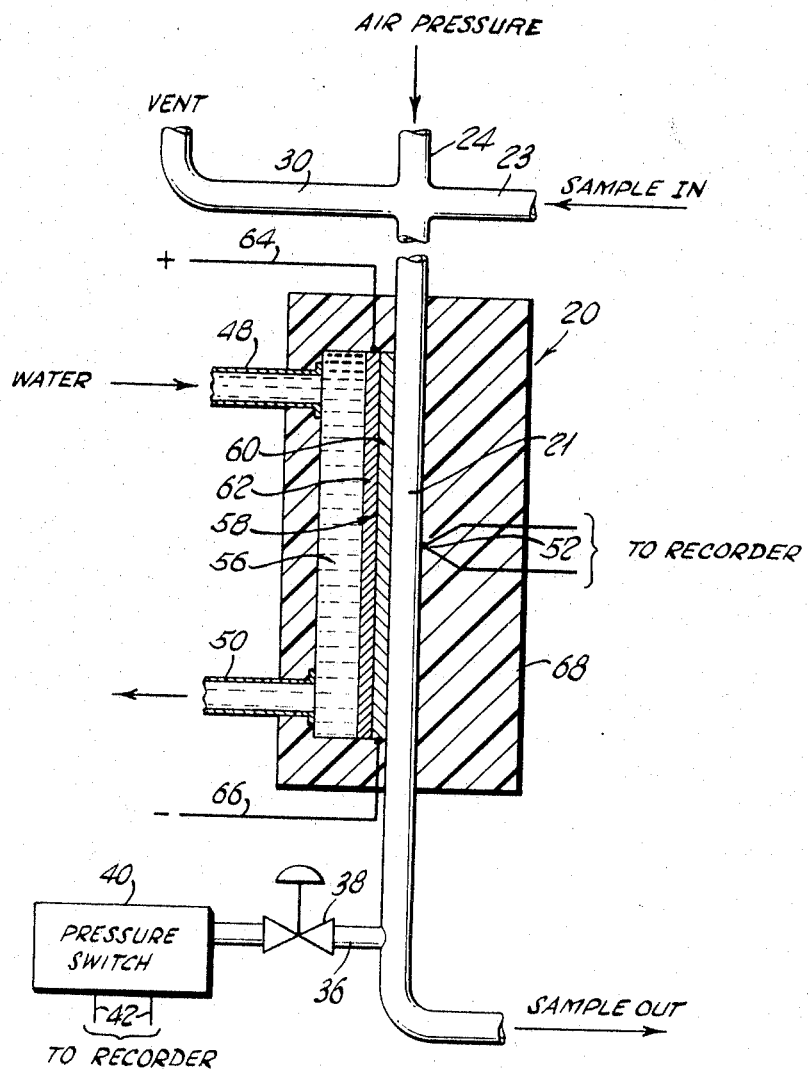

3,442,116
POUR POINT METER
Arden S. Brown, Westfield, N.J., assignor to Esso Research and Engineering Company, a corporation of Delaware
Filed Oct. 5, 1965, Ser. No. 493,015
Int. Cl. G01n 25/02
U.S. Cl. 73—17         3 Claims

ABSTRACT OF THE DISCLOSURE

A pour point measuring apparatus and method wherein a constant pressure is applied directly to one end of a solidified sample which includes a pressure transducer directly responsive to the pressure at the opposite end of the sample. Upon raising the temperature of the sample, the applied pressure is transmitted through the sample directly to the transducer at the opposite end thereof to provide an indication of sample pour point.

---

The present invention relates in general to an improved means and method for measuring the pour point of a normally liquid composition such as lubricating oil. In particular, the present invention relates to improvements in the method and apparatus disclosed in U.S. Letters Patent Nos. 3,122,911 and 3,122,912 assigned to the same assignee as this application.

In assignee's aforementioned patents, a novel pour point determining apparatus and technique were disclosed wherein a pulsating pressure was applied to a sample under test as the sample was either being cooled from a liquid state to a solidified state or alternatively being warmed from a solidified state to a liquid state. The sample of the normally liquid composition in these patents according to this prior teaching was contained in a vessel having an unfilled upper portion in communication with a pressure transducer measuring the gas pressure above the sample container. When the transition of the sample under test between a liquid and a solidified form occurred, a change in the pulsating pressure measured by the pressure transducer was recorded. The sample temperature at which such pressure transmission change occurred was used as an indication of the pour point of the liquid under test.

While the aforementioned technique represents a substantial improvement over the inaccuracies and unrepeatability of other methods of pour point determination in the prior art, it nevertheless contains certain undesirable aspects that are eliminated by the novel and improved method and apparatus of the present invention. In particular, the aforementioned described pour point determination technique was subject to inaccuracies because of the fact that a compressible air volume was employed on the low pressure side of the solidified sample under test and the pulsating pressure introduced by the motor driven bellows means was only transmitted to the pressure transducer through this compressible gas volume. Obviously, measurement of pressure fluctuations were therefore contingent upon a change in volume of the compressible gas above the sample under test and therefore required larger movements of the sample in order to effect a certain desired pressure change at the pressure transducer. A further disadvantage of the prior art pour point determining techniques of the referenced patents is that the fluctuating pressure impulse, being a finite time interval, of necessity left a small but nevertheless measurable period between pulses wherein while the temperature of the sample changed, no pressure was applied. Therefore, an "information gap" so to speak existed between each of the pressure pulses wherein no reading of pressure transmission was being taken through the sample as its temperature approached its pour point.

Another undesirable aspect of applying pressure in a pulsating fashion to a sample is that such fluctuating pressure disturbs the formation of wax crystals during the cooling and solidifying process from the crystalline form that they would normally take had they formed in a non-pulsating cooling cycle as in applicant's present invention.

In contrast, applicant's improved apparatus and method does not supply a pulsating pressure to the solidified sample, but maintains a constant air pressure or force on the sample under test. In this way, no "information gap" or "dead zone" in a test run occurs as in the prior art between pulses and a more accurate pour point indication is obtained. In addition, because applicant's arrangement employs a pressure transducer directly responsive to the liquid pressure of the sample in the test passageway at the end thereof opposite the pressure source, a direct reading of the pressure transmitted through the sample is obtained without recourse to sensing an air pressure change resulting from a change in the level of a liquid in a container. Therefore, due to the direct use of the pressure of the liquid sample under test which is substantially incompressible, no time lag between the pressure transmission breakthrough through the solidified sample and the reading of the pour point temperature is present in applicant's improved arrangement.

Accordingly, it is a principal object of the present invention to provide an improved method and apparatus for determining the pour point of a normally liquid composition such as oil.

A further object of the invention is to provide a novel method of determining the pour point which is highly repeatable and less subject to inaccuracy.

Another object of the invention is to provide an improved automatic apparatus for determining the pour point of successive samples of liquid wherein the introduction of a new sample of liquid is effective to purge the previously tested sample from the sample chamber.

These and other objects and advantages of the invention will become apparent and the invention will be fully understood from the following description and drawings in which:

FIG. 1 is a partially schematic overall view of the pour point apparatus as it could be connected to a pipeline carrying the fluid to be tested; and FIG. 2 is an enlarged sectional and partially schematic view of the thermoelectric heating and cooling unit employed in the sample test cell of FIG. 1.

In order that the invention and principle of operation of the invention may be clearly understood, the illustrative embodiment of FIGS. 1 and 2 will be first comprehensively explained by reference to the principal parts and overall operating arrangement and without reference to the specific detailed parts.

Referring to the drawings, and in particular to FIG. 1, a sample of normally liquid composition, for instance lubricating oil, is removed from a supply pipeline 10 through a takeoff conduit 12, a three-way valve 14 and sample inlet pipe 23 into a sample test cell 20. Prior to introduction of a sample into the test cell 20, the sample liquid may be routed through the other leg of the three-way valve 14 into the by-pass conduit 16 and sample drain or outlet conduit and valve leg 18. After the sample has been caught in the elongated passageway 21 extending through the sample cell 20, it is cooled to about 10° F. below its pour point by a thermoelectric cooling unit 58 (see FIG. 2). A heat transfer medium, such as water, is circulated through a small heat exchanger attached to one side of the thermoelectric cooling unit to remove or add heat as required. The polarity of the power supplied to the thermoelectric unit is reversed (or switched off)

when the desired low temperature point is reached wherein the sample under test is known to be solidified. During the cooling of the sample, its containing passageway is suitably vented to atmosphere through a vent conduit 30 and a venting valve 32 so that as its volume changes, no detrimental effect or false pressure buildup occurs in the test apparatus. After the low temperature point is reached, the vent is closed and an adjustable and preselected air pressure from conduit 24 is transmitted through the solidified sample as it begins to rise again in temperature. When the sample first becomes fluid, the air pressure applied to the top end of the sample cell through the conduit 24 is transmitted through the now liquid sample, which is substantially incompressible, and such pressure is picked up by a pressure sensing device or switch 40 in direct liquid communication with the bottom end of the sample passageway. When the pressure sensing device, which includes an electrical switch, transfers to a closed electrical condition upon the presence of pressure at the bottom end of the sample cell passageway, a signal is sent to a recording unit 44 which records the temperature sensed by thermocouple 52 at the instant when the electrical switch in the element 40 closes. This recorded temperature point represents the pour point of the sample under test.

Referring in more detail to the specific construction of the present invention, the sample test cell 20 includes an elongated passageway means or conduit 21 extending vertically therethrough for the capture and testing of a sample therein. The top end of the passageway 21 is joined to an inlet conduit arrangement shown generally at 22. The inlet arrangement 22 includes a sample inlet conduit 23, a vent line 30, vent control valve 32, and a pressure application line 24. The line 24 includes a diaphragm control valve 26 and a pressure regulator valve 28.

At the bottom of the sample cell is an outlet conduit network generally designated 34. The network 34 includes a pressure switch branch line 36 in communication through a shutoff valve 38 with a pressure sensitive switch 40. The switch 40 includes a pair of normally open contacts (not shown) connected to a pair of electrical leads 42 attached to a pour point recorder 44. Also attached to the recorder 44 are a pair of electrical leads 54 which are connected to the output of a thermocouple element 52 located on the exterior of the passageway means 21. The sample test cell outlet network 34 also includes a branch leg 45 communicating with a shutoff valve 46, which in turn communicates with the lower end of the by-pass conduit 16 and the outlet branch 18.

Referring to FIG. 2 in detail, the specific construction of one form of thermoelectric cooling and heating means is shown. Those skilled in the art will readily appreciate that other forms of refrigeration and heating means could be used to equal advantage. Accordingly, while applicant's invention is in no way limited to the disclosed specific thermoelectric means, it has been found that this refrigeration unit operates quite satisfactorily and represents a preferred method for solidifying and subsequently heating the sample under test.

The thermoelectric cooling unit 58 operates on the Peltier effect and includes a water jacket 56 which communicates with an inlet conduit 48 and an outlet conduit 50 through which any convenient heat exchange liquid such as water may be circulated. The thermoelectric cooling unit includes a pair of plates 60 and 62 to which D.C. electrical energy is transmitted respectively through electrical leads 64 and 66. With the polarity as shown in FIG. 2 on leads 64 and 66, the plate 60 will become cool while the plate 62 will become hot and the heat of plate 62 will be conducted away by the circulating water within the jacket 56. The test cell 20 includes an outer insulation cover 68 which may preferably be made of polyurethane foam material.

In operation, either manually or by suitable automatic sequencing control mechanism (not shown), a sample of normally liquid solution is withdrawn from pipeline 10 through conduit 12 through three-way valve 14, line 23 into the sample passageway 21. During this initial filling step, control valves 26, 32 and 38 are closed while valves 46 and 18 remain open. Once the sample passageway 21 is thereby filled with the liquid to be tested, the valve 46 closes and the three-way valve 14 transfers to place the conduit 12 in communication with the by-pass conduit 16. Thereafter, the thermoelectric cooling unit is energized to cool and solidify the sample in the passageway 21 and at substantially the same time venting valve 32 is opened. When the temperature sensed by the thermocouple 52 decreases to a predetermined low temperature set point below the pour point of the fluid under test, a suitable signal is produced to interrupt the power to the thermoelectric cooling unit 58. Thereafter, either by turning off the electrical current to the unit 58 or by reversal of the polarity, a desired temperature increase may be programmed into the sample to gradually raise its temperature up to and above its anticipated pour point temperature. Before this pour point temperature is reached, vent valve 32 closes and pressure application valve 26 opens to apply a pre-set predetermined pressure on the top end of the passageway 21. Valve 38 is also open at this stage. As the temperature gradually rises in the sample cell passageway 21 and the pour point of the sample is gradually approached, the thermocouple 52 is effective to send an appropriate signal proportional to temperature to the recorder. In the embodiment preferred, the recorder would include a potentiometer driven recording needle which would be raised above the printing position on an appropriate piece of graphically scaled temperature recording paper. When the instant comes that the temperature in the sample passageway 21 is sufficiently high so that the pressure in conduit 24 is reflected downwardly therethrough to exceed a pre-set threshold pressure of the pressure switch 40, the circuit is closed between the electrical leads 42 so that the needle on the recorder 44 prints a single dot on recorder paper representative of the temperature at which the pressure is first sensed by the pressure switch 40. Those skilled in the art will appreciate that alternate recording means may be utilized without departing from the scope of the invention.

Thus, it may be seen how applicant's invention has provided an improved pour point recorder wherein a non-pulsating but constant pressure supplied through pressure regulating valve 28 is applied to the top end of a column of incompressible liquid having a central solidified portion completely filling a passageway 21. As the solidified liquid in the passageway 21 is heated and approaches its pour point, the pressure applied to the top end of the passageway is reflected downwardly through an incompressible liquid extending throughout the passageway 21, line 36 and open valve 38 to the pressure switch 40. No time lag is experienced in applicant's arrangement due to the total absence of any compressible gas such as utilized in the aforementioned references or due to gaps between pressure cycles. Furthermore, the crystalline structure of the solidified sample is more representative as solidification thereof does not occur in a pulsating pressure environment as in the foregoing patents. Accordingly, a substantially improved accuracy and repeatability pour point meter is produced by applicant's invention over the prior art.

While a specific embodiment of the invention has been shown and described in detail to illustrate the application of the inventive principles, it should be understood that the invention may be embodied otherwise without departing from such principles.

What is claimed is:

1. Apparatus for determining the pour point of normally liquid compositions comprising, means defining an enclosed passageway having an opening at each end, means for filling the entire length of the passageway means with a sample of the liquid composition to be tested, means for cooling and solidifying said normally liquid composition along at least a portion of the length of said passageway means, means for applying a constant predetermined pressure at one end of said passageway means to the liquid composition therein after it has solidified, means for raising the temperature of the solidified portion of said normally liquid composition in said passageway means, means for measuring the temperature of the solidified portion, means at the opposite end of said passageway means for measuring the pressure of the composition therein, and means for recording the temperature at which a predetermined portion of the applied pressure is first transmitted to the opposite end of said passageway means as said liquid composition is raised in temperature.

2. The apparatus of claim 1 including means for introducing a further sample of normally liquid composition into the entire length of said passageway means to thereby simultaneously introduce the next sample and purge the preceding sample therefrom.

3. The apparatus of claim 2 wherein a reversible thermoelectric means serves alternatively as said cooling means and said temperature raising means, and includes insulation means completely enclosing a central portion of said passageway means.

References Cited

UNITED STATES PATENTS

| | | | |
|---|---|---|---|
| 3,122,911 | 3/1964 | Conklin | 73—17 |
| 3,122,912 | 3/1964 | O'Neill | 73—17 |
| 3,143,876 | 8/1964 | Wallgren | 73—17 |
| 3,289,460 | 12/1966 | Anderson | 73—17 |

JAMES J. GILL, *Primary Examiner.*

R. S. SALZMAN, *Assistant Examiner.*